(12) United States Patent
Wang et al.

(10) Patent No.: US 8,416,874 B2
(45) Date of Patent: Apr. 9, 2013

(54) METHOD OF OPERATING A BLOCK TRANSMISSION BASED COMMUNICATION APPARATUS

(75) Inventors: Yue Wang, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 778 days.

(21) Appl. No.: 12/559,084

(22) Filed: Sep. 14, 2009

(65) Prior Publication Data
US 2010/0091904 A1 Apr. 15, 2010

(30) Foreign Application Priority Data
Sep. 16, 2008 (GB) .................................. 0816967.4

(51) Int. Cl.
*H04B 7/02* (2006.01)
*H04K 1/02* (2006.01)
(52) U.S. Cl. ........................................ 375/267; 375/296
(58) Field of Classification Search .................. 375/296, 375/267, 295, 260, 259
See application file for complete search history.

(56) References Cited

U.S. PATENT DOCUMENTS

| | | | |
|---|---|---|---|
| 2005/0128966 A1* | 6/2005 | Yee ................................ | 370/310 |
| 2005/0213676 A1* | 9/2005 | Stopler ........................... | 375/260 |
| 2007/0293256 A1* | 12/2007 | Merched et al. ............... | 455/504 |
| 2009/0316804 A1* | 12/2009 | Chen et al. ..................... | 375/260 |

FOREIGN PATENT DOCUMENTS

| | | |
|---|---|---|
| JP | 1-181362 A | 7/1989 |
| JP | 2005-533417 | 11/2005 |
| WO | WO 01/80446 A2 | 10/2001 |
| WO | WO 2006/019255 A1 | 2/2006 |

OTHER PUBLICATIONS

Naofal Al-Dhahir, et al., "Optimum DCT-Based Multicarrier Transceivers for Frequency-Selective Channels", IEEE Transactions on Communications, vol. 54, No. 5, May 2006, pp. 911-921.

Wei Min, et al., "A Novel TR-STBC-OFDM Scheme for MIMO-OFDM", IEEE International Conference on Communications, Circuits and Systems Proc., 2006, pp. 1207-1211.

Syed Imtiaz Husain, et al., "Impulse Response Shortening through Limited Time Reversed Channel in MB OFDM UWB Systems", IEEE International Symposium on Communication and Information Technologies, 2007, pp. 1269-1273.

H. Lui, et al., "OFDM-based wireless networks", Chapter 4, Phy Layer Issues—Spatial Processing, 2005, pp. 80-85.

(Continued)

*Primary Examiner* — David C. Payne
*Assistant Examiner* — Brian J Stevens
(74) *Attorney, Agent, or Firm* — Oblon, Spivak, McClelland, Maier & Neustadt, L.L.P.

(57) ABSTRACT

A block of information is processed before transmission thereof in a block transmission based communication. This comprises inserting a cyclic prefix and a cyclic suffix into the block of information before applying a time reversal based prefilter prior to transmission to the data after cyclic prefix and cyclic suffix insertion, the prefilter being configured on the basis of knowledge of the condition of the channel over which communication is to be effected. Then, at the receiver, a removal operation is operable to remove the effect of cyclic prefix and suffix insertion, leaving a circulant shifted version of the original block. This can be decoded using a diagonal matrix containing frequency domain channel coefficients on its diagonal entries after FFT. For systems with more than two transmit antennas, this facilities the use of full rate OSTBC, regardless of whether real or complex signaling is transmitted.

11 Claims, 6 Drawing Sheets

OTHER PUBLICATIONS

Hamid Jafarkhani, "A Quasi-Orthogonal Space-Time Block Code" IEEE Transactions on Communications, vol. 49, No. 1, Jan. 2001, pp. 1-4.

P. Golden, et al., "Fundamentals of DSL Technology", 2006, pp. 190-197.

Japanese Office Action issued Oct. 4, 2011 in Patent Application No. 2009-214385 with English Translation.

Japanese Office Action issued Jul. 12, 2011 in Patent Application No. 2009-214385 with English Translation.

Nafal Al-Dahir et al., "A DCT-Based Broadband Multicarrier Transceiver", SoutheastCon, 2006. Proceedings of the IEEE, Mar. 31, 2005, pp. 175-180.

* cited by examiner

PRIOR ART

METHOD OF OPERATING A BLOCK TRANSMISSION BASED COMMUNICATION APPARATUS

CROSS REFERENCE TO RELATED APPLICATIONS

This application claims priority Under 35 U.S.C. §119 to UK Application No. 0816967.4 filed Sep. 16, 2008, the entire contents of which are incorporated by reference herein.

BACKGROUND OF THE INVENTION

1. Field of the Invention

The present invention is concerned with wireless communications apparatus, and associated methods, operable to make wireless communication emissions on the basis of the block transmission approach.

2. Discussion of Background

Aspects of the invention can apply to any wireless communication devices that use block transmissions when channel state information is available at the transmitter. Examples of block transmissions are orthogonal frequency division multiplexing (OFDM) and single carrier block transmission with frequency domain equalization (SC-FDE).

Aspects of the invention may apply to any products that use OFDM and/or SC-FDE transmissions. Examples of these include devices compliant with IEEE 802.11 a/b/g/n, IEEE 802.16 e/j/m, and potentially IEEE 802.15.3c 60 GHz devices.

The field of the invention will now be described, with reference to a description of conventional wireless communications technology employing block transmission with cyclic prefix insertion and removal.

Block transmission for use in wireless communications has been widely investigated in published literature (e.g., Z. Wang and G. B. Giannakis, "Wireless Multicarrier Communications: Where Fourier Meets Shannon" IEEE Signal Processing Magazine, Vol. 17, No. 3, pp. 29-48, May 2000). Two well-known block transmission schemes are Orthogonal frequency-division multiplexing (OFDM) and Single carrier with frequency domain equalization (SC-FDE), which have been widely adopted in world-wide standards such as IEEE 802.11, IEEE 802.16 and IEEE 802.15.3c.

Figure 1:
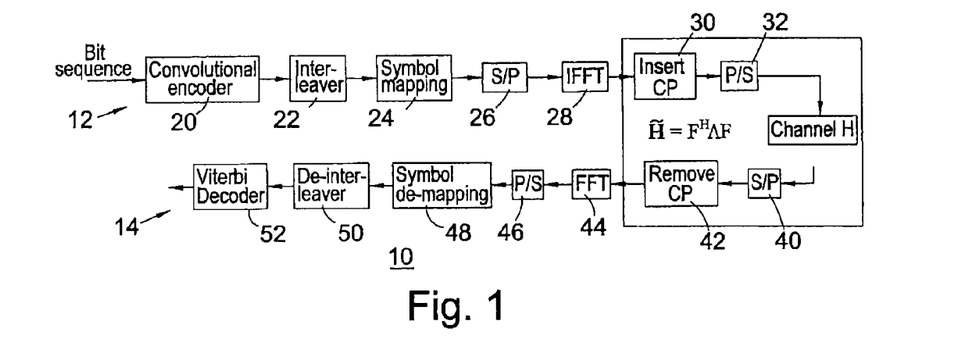
FIG. 1 is a schematic diagram of a convention OFDM communication system with a single transmit antenna.
Figure 2:
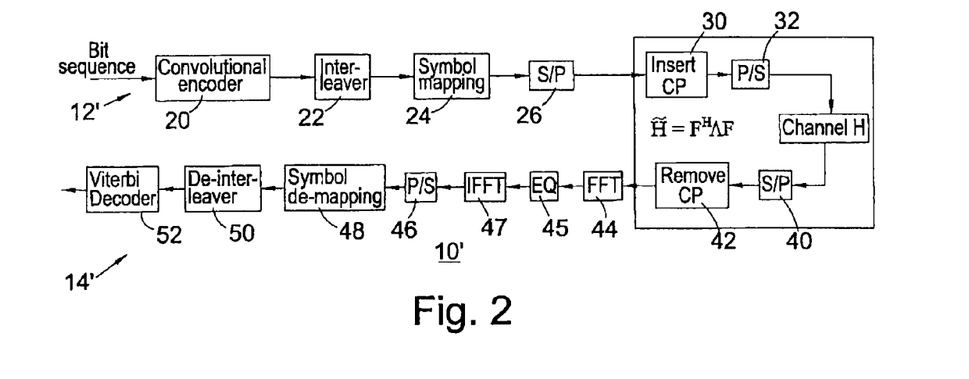
FIG. 2 is a schematic diagram of a convention SC-FDE communication system with a single transmit antenna.

Block diagrams of the conventional OFDM and SC-FDE systems with a single transmit and receive antenna are shown in FIGS. 1 and 2 respectively.

FIG. 1 illustrates an example of a communication system 10 in schematic form. A transmit train 12 is illustrated receiving a bit sequence, which is input to a convolutional encoder 20 and then to an interleaver 22. Symbol mapping 24 is then applied to the data, which is then converted from serial to parallel 26. The parallel data is then converted from frequency to time domain by an IFFT 28. A cyclic prefix is then inserted 30 and then, prior to transmission on a single antenna, the data is converted back from parallel to serial 32.

A transmission channel is illustrated as represented by a channel matrix H. A receiver train 14 as illustrated receives transmitted signals on a single antenna, and these transmitted signals are converted from serial to parallel 40 and then the cyclic prefix is removed 42. Thereafter, a fast Fourier converts the signal from time to frequency domain and the resultant frequency subcarriers are converted from parallel to serial. Symbol de-mapping takes place 48 and then the de-mapped symbols are deinterleaved 50 and a Viterbi decoder 52 extracts a bit sequence.

FIG. 2 illustrates a similar arrangement of transmitter train, channel and receiver train, for SC-FDE. In that arrangement, the IFFT 28 of the transmitter train in FIG. 1 is omitted, and, between the FFT 44 and the parallel to serial converter 46 of the receiver train, an equaliser 45 (which can be a frequency domain zero-forcing equalizer or a frequency domain minimum mean-squared error equalizer) and an IFFT 47 are included. This takes account of the different operation of SC-FDE over OFDM.

Figure 3:
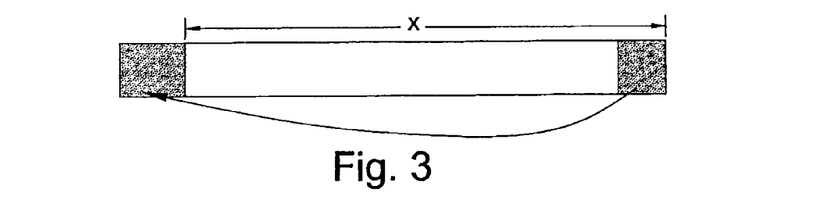
FIG. 3 illustrates insertion of a cyclic prefix in conventional systems such as those illustrated in FIGS. 1 and 2.
Figure 4:
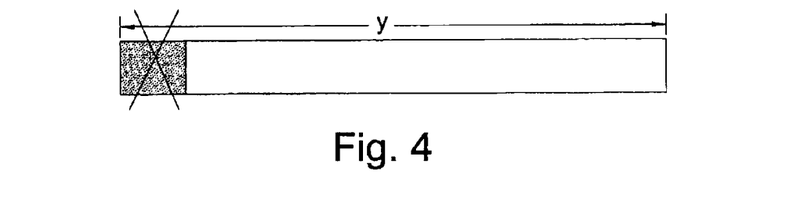
FIG. 4 illustrates removal of a cyclic prefix in conventional systems such as those illustrated in FIGS. 1 and 2.

In both systems, a cyclic prefix (CP) of length L, which is a copy of the last L symbols in a block, is inserted at the beginning of this block at the transmitter. At the receiver, the first L received symbols in each block are discarded. The insertion and removal of the CP is illustrated in FIGS. 3 and 4, where x (FIG. 3) is a block of transmitted symbols before CP insertion, and y (FIG. 4) is the block of the received data before CP removal.

When the length of the CP is greater than or equal to the channel delay spread, the insertion and removal of CP at the transmitter and the receiver converts the Toeplitz channel matrix H into a circulant one ($\tilde{H}$), which can be decomposed as $\tilde{H}=F^H \Lambda F$, where F denotes the Fourier transform matrix, $F^H$ denotes its Hermitian transpose, and $\Lambda$ is a diagonal matrix with its kth diagonal entry being the kth frequency domain channel coefficient.

With the subsequent fast Fourier transform (FFT) 44, the resulting channel can be considered as flat over each OFDM subcarrier for an OFDM system, or over each frequency domain symbol of the transmitted block for an SC-FDE system, thus allowing a simple, one-tap frequency domain equalizer to remove the inter-symbol interference in both systems.

It should be noted that, for systems with channel coding as shown in FIG. 1, the equalizer may be included in the Viterbi soft decoder to improve the performance.

The examples given in FIGS. 1 and 2 are concerned with baseband transmission. In the discrete time domain, each channel tap is a complex number. The frequency domain channel coefficients, which contain the Fourier transform of the time domain channel taps, are complex as well.

Various methods of generating a circulant channel matrix exist. For example, zero padding (ZP) or cyclic suffix (CS) can also be used. The use of CP and/or CS in OFDM for the purpose of precise symbol timing is detailed in J. Chun, B. Ihm, and Y. Jin, "Method for detecting OFDM symbol timing in OFDM system", (LG Electronics Inc., International Patent WO 2006/019255, February 2006). However, in that publication, no receiver structure is discussed.

Time reversal (TR) is a feedback technique that has attracted much interest in acoustic and medical applications. Recently, the application of TR to wireless communication has also been investigated. In a TR system, channel state information is made available at the transmitter, through feedback from the receiver (if frequency-division duplexing is employed) or by utilising the reciprocity of the channel (if time-division duplexing is employed).

For example, in a system in which a wireless channel has a channel impulse response h(t), a TR system prefilters the transmitted signal by the time-reversed, complex-conjugated channel impulse response, and then transmits the resulting signal.

Figure 5:
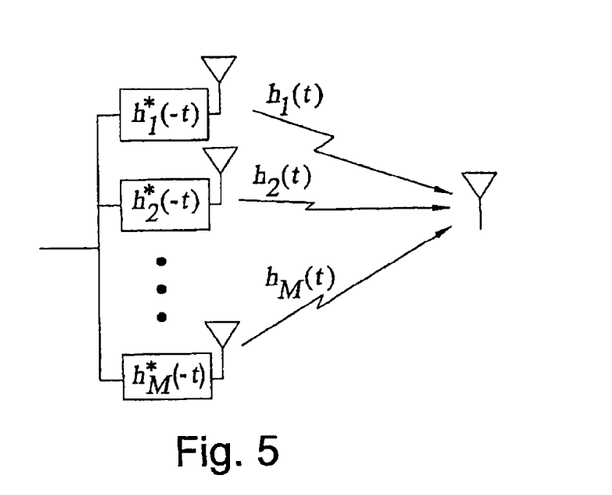
FIG. 5 illustrates time reversal employed in a communications system with M transmit antennas and one receiver antenna.

A TR system with M transmit antennas and one receiver antenna is illustrated in FIG. 5, where $h^*_k(-t)$ is the prefilter applied on the k th transmitted antenna. The prefilter is the time-reversed, complex-conjugate of $h_k(t)$, which is the channel impulse response between the kth transmitted antenna and the receiver.

Due to prefiltering, the equivalent composite channel, which is the convolution of the TR prefilter and the channel impulse response, is essentially the auto-correlation of the channel impulse response, i.e., $$g(t)=h(t) \otimes h^*(-t)$$

where $\otimes$ denotes convolution. The equivalent channel impulse response, therefore, has an enhanced energy at and near its centre, and a diminished energy at the tail. This is the "time focusing" property of a TR system. In a multi-antenna/multiple access scenario, TR also provides "space focusing" where energy can be focused to an intended receive antenna or an intended user.

The "time focusing" and "space focusing" properties of TR have been exploited in communication systems. For example, the "time focusing" property essentially allows for fewer time domain equalizer taps at the receiver. Examples can be found in impulse radio ultra-wideband (UWB) systems. Unfortunately, the study of TR was limited to symbol-by-symbol transmissions, and few (if any) researchers have considered the complex symmetry of the resulting equivalent channel taps due to the TR prefilter.

Space-time block coding (STBC) has received considerable interest in systems with multiple transmit antennas. The advantage of orthogonal space-time block coding (OSTBC) is the simplicity of the decoder. One well-known example of OSTBC is Alamouti space-time block coding for two transmit antennas, which achieves full rate (rate one) and full diversity for both real and complex signalling.

Using the theory of orthogonal design, the Alamouti STBC can be extended for more than two transmit antennas using a generalized orthogonal design. Under certain circumstances and for systems with M transmit antennas, a generalized orthogonal matrix with size p×M and entries 0, $\pm x_1$, $\pm x^*_1, \ldots, \pm x^*_k, \pm x_k$ can be formed, and the transmission rate is defined as R=k/p.

It has been shown that, when complex signalling is transmitted (e.g., QPSK), full rate (R=1) orthogonal designs exist only for two transmit antennas. However, full rate OSTBC exists for M≧2 transmit antennas when real constellations such as BPSK are used.

For systems transmitting complex signalling using more than two transmit antennas, previous attempts have focused on seeking orthogonal designs at the expense of a rate loss (e.g., rate ¾ and rate ½ OSTBC), or using quasi-orthogonal designs with full rate at the expense of increasing decoder complexity or a losing diversity.

Utilizing channel state information at the transmitter (CSIT), transmit precoding has been extensively investigated for systems with multiple transmit antennas, to increase either transmission rate, coverage, or robustness, and has also been considered in future wireless applications (e.g., IEEE 802.16).

Figure 6:
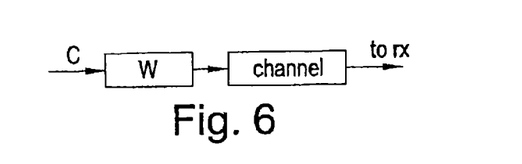
FIG. 6 illustrates schematically a process of transmit pre-coding in a communications system.

The transmitter structure with precoding is illustrated in FIG. 6, where W is the precoding matrix/vector, and C is the codeword encoded from the transmitted signal. The codeword can be a space-time block coded signal of size M×T, with M being the number of transmit antennas and T being the time slots, or simply a scalar transmitting on the kth transmitter antenna, weighted by the kth entry of the precoding vector, $w_k$. It has been shown that the optimal transmission, that minimizes the average pairwise codeword error probability (PEP), is the single mode eigen-beamforming, where the precoding vector is the dominant eigenvectors of $H_t^H H_t$, where $H_t$ is the MISO channel matrix of size 133 M. In block transmissions such as OFDM, precoding may be applied on a per subcarrier basis.

The present description of the field of the invention will now consider, by way of example, a system with multiple transmit antennas and one receive antenna (i.e., multiple input and single output (MISO)), with perfect CSIT.

Prior art examples will now be used to illustrate issues apparent in the field of the invention.

When a channel impulse response is real-valued, convolution of the channel impulse response with its time-reversed counterpart provides symmetry (not only complex symmetry) in the resulting equivalent channel. Exploiting this symmetry, a discrete cosine transform (DCT) can be used instead of an FFT in a multicarrier system to diagonalise the channel matrix, resulting in real-valued DCT channel coefficients. This method was proposed and discussed in N. Al-Dhahir, H. Mimi and S. Satish, "Optimum DCT-Based Multicarrier Transceivers for Frequency-Selective Channels", *IEEE Trans. on Comm.* Vol. 54, May 2006, pp. 911-921. The main differences between Al-Dhahir and the conventional multicarrier systems are that:

1. A front-end prefilter at the receiver is used in Al-Dhahir. The prefilter coefficients are designed as $$w = R_{yy}^{-1} R_{yx} g$$

where $R_{yx}$ and $R_{yy}$ are the output-input cross correlation and the output autocorrelation matrices, respectively, and g is the equivalent channel obtained by convolving the original channel impulse response and its time reversed channel. Alternatively, as discussed in Al-Dhahir, the prefilter coefficients can also be designed as the time-reversed channel, resulting in an overall symmetric equivalent channel impulse response. It will be observed that the abovementioned symmetry of an equivalent channel can only be obtained when the channel impulse response is real-valued, which is usually not true when baseband transmission is considered and when complex signalling is transmitted.

Figure 7:
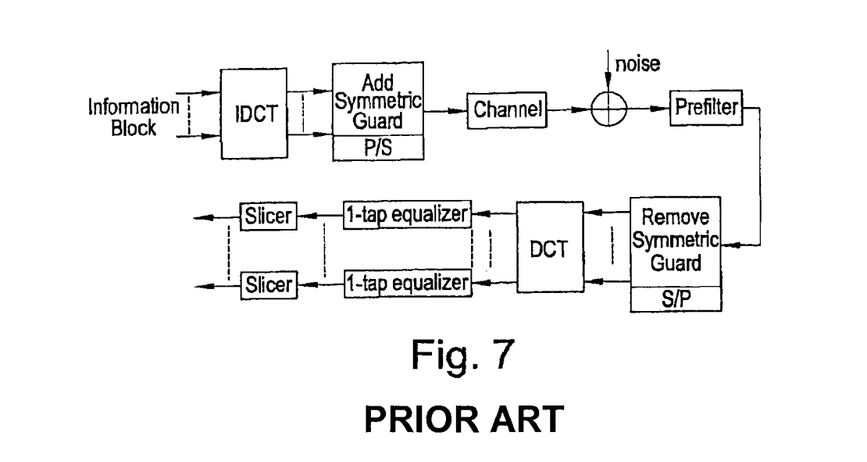
FIG. 7 illustrates transmission block format and receiver structure in accordance with a prior art example, for a DCT based multicarrier system for real signalling.
Figure 8:
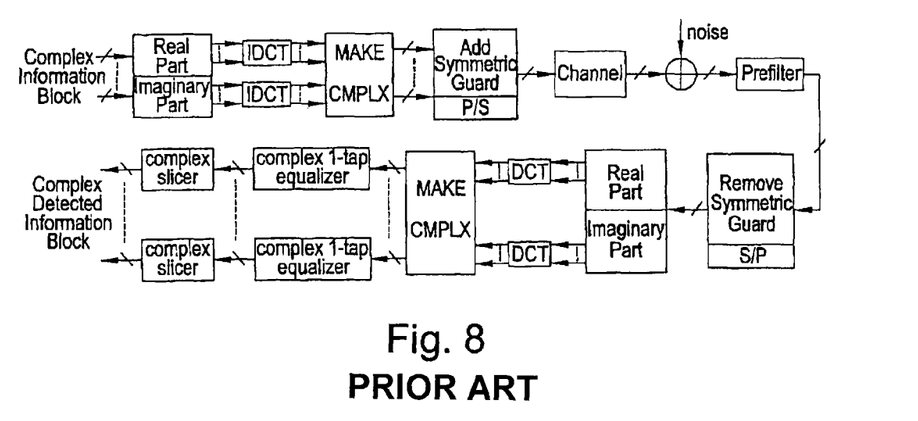
FIG. 8 illustrates transmission block format and receiver structure in accordance with another prior art example, for a DCT based multicarrier system for complex signalling.

2. When the equivalent channel impulse response is symmetric, the conventional IDFT and DFT used at the transmitter and receiver in a multicarrier system can be replaced by the IDCT and DCT operations, resulting in real-valued DCT channel coefficients. A transceiver block diagram of the DCT-based multicarrier system for real signalling is shown in FIG. 7. When the transmitted signal is complex-valued, the equivalent channel becomes complex-symmetric, the above illustrated transceiver structure has to be tailored into two branches to process the real and complex components of the complex signals respectively, as is illustrated in Al-Dhahir. A transceiver block diagram of the DCT-based multicarrier approach to complex signalling is shown in FIG. 8.

The use of TR in STBC was presented in E. Lindskog and A. J. Paulraj, "Time-reversal block transmit diversity system for channels with intersymbol interference and method", (Standford, International Patent WO/2001/080446, October 2001), in which transmitted signals (rather than the channel impulse responses) are time reversed, and complex conjugated before transmitting from one of the given transmit antennas in one of the given time slots. The transmission block format of Lindskog and Paulraj is presented in FIG. 9, where "GS" denotes guard sequence and conventional CP insertion is used where the last L data symbols are "copied" to the beginning of each block.

In Lindskog and Paulraj, expressing the length-L discrete frequency-selective channel $h=[h_1, h_2, \ldots, h_{L-1}]^T$ by a polynomial in the unit delay operator $q^{-1}$ as $$h(q^{-1}) = h_0 + h_1 q^{-1} + \ldots + h_{L-1} q^{-L+1}$$

the noiseless received signal can be written as $$y(t)=h(q^{-1})x(t)$$

where x(t) is the symbol sequence transmitted from the antenna. Or, in the discrete form, the received signal can be expressed as $$y(q^{-1})=h(q^{-1})x(q^{-1}).$$

Figure 9:
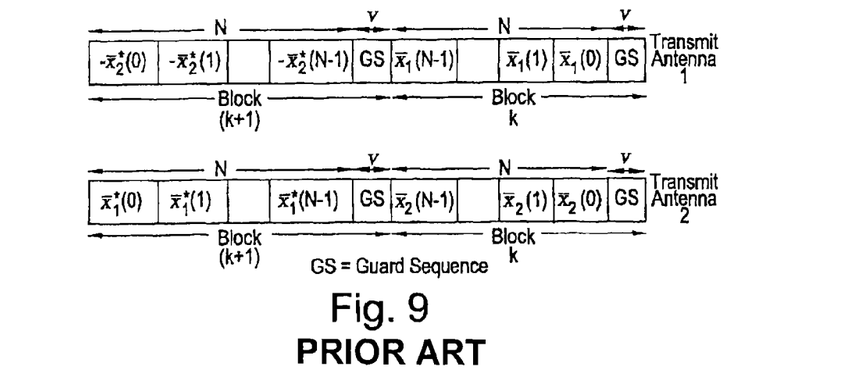
FIG. 9 illustrates transmission block format for a TR-STBC system in accordance with a prior art example.
Figure 10:
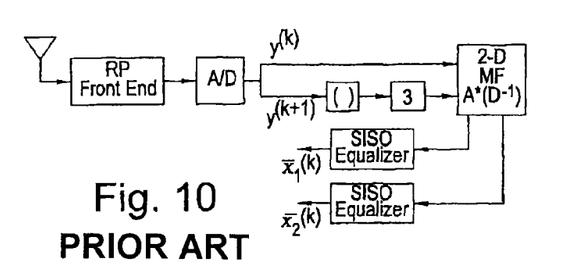
FIG. 10 illustrates the receiver structure for a TR-STBC system in accordance with a prior art example.

Considering two transmit antennas with the transmission format given by FIG. 9, the noiseless received signals on the $1^{st}$ and the $2^{nd}$ antenna are given by $$z_1 = y^{(k)}(q^{-1}) = h_1(q^{-1})x_1(q^{-1}) + h_2(q^{-1})x_2(q^{-1})$$

and $$z_2 = (y^{(k+1)})^*(q) = h^*_2(q)x_1(q^{-1}) - h^*_1(q)x_2(q^{-1}).$$

Expressing $z_1$ and $z_2$ in a matrix form:

$$z = Hx$$

where $z=[z_1,z_2]^T$, $x=[x_1,x_2]^T$, and $$H(q^{-1}) = \begin{bmatrix} h_1(q^{-1}) & h_2(q^{-1}) \\ h^*_2(q) & -h^*_1(q) \end{bmatrix}.$$

After 2-D matched filtering at the receiver, the received signal becomes $$\begin{bmatrix} r_1 \\ r_2 \end{bmatrix} = H^H(q^{-1})H(q^{-1})x$$

$$= \begin{bmatrix} h_{eq}(q^{-1}) & 0 \\ 0 & -h_{eq}(q^{-1}) \end{bmatrix} x$$

where $$h_{eq}(q^{-1}) = h^*_1(q)h_1(q^{-1}) + h^*_2(q)h^*_2(q^{-1}).$$

The detection of $x_1$ and $x_2$ thus decouples. It will be noted that the inter-symbol interference (ISI) still exists in each block. This is resolved in Lindskog and Paulraj by using the maximum likelihood sequence estimation (MLSE) algorithm.

In addition to TR-STBC, both OFDM-STBC and SCFDE-STBC have also been described such as in D. Wang, L. Jiang, and C. He, "A MIMO Transceiver Scheme using TR-STBC for Single-Carrier UWB Communications with Frequency domain Equalization", (*IEEE CHINACOM '07*, August 2007, pp. 1142-1146).

Although real-valued DCT channel coefficients can be generated using the method provided in the first prior art reference Al-Dhahir, this is limited to real signalling only. When complex signals are transmitted, the convolution of a time reversed prefilter at the receiver:

"results in a conjugate-symmetric overall CIR, where only the real part is symmetric, whereas the imaginary part will be antisymmetric, and hence not diagonalizable by the type-II DCT" Al-Dhahir.

Therefore, when complex signals such as QPSK are used, real-valued DCT channel coefficients cannot be obtained, and two branches of IDCT/DCT have to be used to deal with the real and complex components of the complex signal, indicating an increase in complexity.

There are two major problems in the second prior art document Lindskog and Paulraj:

1. As for the orthogonal designs of STBC code for complex constellation, the arrangement described in Lindskog and Paulraj is limited to two transmit antennas when full rate transmission is desired. The decoupling of two blocks is based on the orthogonality of the MIMO channel matrix $H(q^{-1})$, which can be realised by an Alamouti-like transmission structure for two transmit antennas. When the number of transmit antennas is greater than two, full rate orthogonal designs with rate one do not exist for complex constellations, and therefore cannot be used to achieve full rate by directly using the method provided in Lindskog and Paulraj.

2. Inter-symbol interference exists in each block, and the use of MLSE for signal detection in the time domain can be computational complex.

As with TR-STBC (Lindskog and Paulraj) other prior art technologies exist that apply STBC to block transmissions, where a block of symbols that are either time-reversed and complex-conjugated or simply complex-conjugated before transmitting over one of the given antennas in one of the given time slots. These prior art technologies are considered as extensions of STBC to block transmissions. Examples are TR-STBC, OFDM-STBC, and SCFDE-STBC (Wang and Jiang).

In these extensions, the CP insertion and removal follows that of conventional block transmissions (e.g., FIGS. 3 and 4), and the frequency domain channel coefficients are complex-valued. This limits the use of full rate OSTBC to systems with more than two transmit antennas when complex constellations are employed, since full rate OSTBC only exists for real constellations when the number of transmit antennas is greater than two. As a simple example, when the number of transmit antennas is four, and when symbols are mapped onto a complex constellation such as QPSK, none of the prior art technologies can achieve full rate using the existing OSTBC.

None of the abovementioned prior art examples consider the complex-symmetry of the equivalent channel in a TR system. Although the channel symmetry of a TR system was explored in Al-Dbahir, the real-valued DCT channel coefficients are unfortunately limited to real signalling only, and two branches of DCTs are required to process the real and imaginary components of a signal when it is complex-valued.

SUMMARY OF THE INVENTION

An aspect of the present invention provides a method of CP/CS insertion and removal in a TR system such that real-valued frequency domain channel coefficients can be obtained, and shows how the real-valued frequency domain channel coefficients will facilitate the application of the OSTBC conventionally designed for real constellations to systems with an arbitrary number of antennas, regardless of whether real constellations or complex constellations are used.

Another aspect of the invention provides a method of generating real-valued frequency domain channel coefficients for block transmissions using the time reversal technique.

That aspect of the invention may comprise a method of forming an equivalent channel impulse response (CIR), with its first tap $g_0$ being real-valued and the rest of the channel taps being complex symmetric in the sense that $g_k = g^*_{2L-k}$, for $k=0,\ldots,2L-1$, where $g_k$ is the k th tap of the equivalent time domain channel impulse response, 2L is the length of the equivalent channel impulse response, and $(\square)^*$ a denotes complex conjugate.

That aspect of the invention may comprise a method of cyclic prefix (CP) and cyclic suffix (CS) insertion for block transmissions, with the length of CP/CS larger than or equal to the channel delay spread, at the beginning and end of each transmitted block, respectively, where the said transmitted block is one OFDM symbol containing N subcarriers in an OFDM system, or a block of time domain symbols of length N in an SC-FDE system.

That aspect of the invention may comprise the removal of twice the length of the inserted CP or CS at the receiver from the beginning of the received data.

The above method may be applied to systems with single or multiple transmit antennas.

Another aspect of the invention comprises a system using the method as set out in any statement above, further comprising its application to systems with arbitrary number of multiple transmit antennas to achieve full rate OSTBC for real or complex signalling, by using the existing full rate OSTBC design for real signalling, while such full rate OSTBC does not exist for system with more than 2 transmit antennas when complex signalling is used.

The system may be applicable to systems with arbitrary number of multiple transmit antennas using other types of STBC. This may include the non-orthogonal STBC.

Another aspect of the invention comprises a transmit block structure formed in block transmissions by way of a method according to any of the preceding statements. Additional transmit precoding may be used to improve performance.

Another aspect of the invention provides a communications apparatus operable to transmit a block transmission, the apparatus comprising a TR prefilter, such that CP/CS is inserted and removed in such a way that the equivalent time domain channels are complex-symmetric and the frequency domain channel coefficients are real-valued. As a result, full rate OSTBC, which is designed for real signaling and does not exist in conventional systems with more than two transmit antennas for complex signaling, can now be applied to complex signaling.

Another aspect of the invention provides a method of processing a block of information before transmission thereof in a block transmission based communication, the method comprising applying a time reversal based prefilter to the data, the prefilter being configured on the basis of knowledge of the condition of the channel over which communication is to be effected, and inserting a cyclic prefix and a cyclic suffix into the block of information before transmission.

The method may be applied to a block of information intended for transmission from two or more antenna streams.

The method may comprise encoding blocks of data for transmission by way of space time block coding, said space time block coding being orthogonal for real signalling yet not orthogonal for complex signalling when the number of transmit antennas is higher than two.

Inserting of said cyclic prefix may comprise copying a portion of information located at the end of the block opposite the end at which said prefix is to be inserted.

Inserting of said cyclic suffix may comprise copying a portion of information located at the end of the block opposite the end at which said suffix is to be inserted.

The cyclic prefix and cyclic suffix may be of equal length, but it will be appreciated that this is not essential to the performance of the invention.

The step of inserting a cyclic prefix and a cyclic suffix may result in a processed block of information whose transmission defines a channel which can be represented by a circulant channel matrix, wherein a first column of the matrix is complex symmetric and a first entry of said column is real valued.

Another aspect of the invention comprises signal transmission apparatus comprising a block transmission processor operable to perform processing in accordance with the above, and transmitting means operable to transmit the resultant processed block of information.

Another aspect of the invention provides a method of processing a signal received over a communications channel, the signal comprising a block transmission, the method comprising removing a length of said received block at one end thereof, representative of the combined length of a cyclic prefix and a cyclic suffix.

The method may further comprise decoding the resultant block, taking account of circulation of information in said block as a result of removal of said cyclic suffix from the head of said block rather than from the end of said block.

The decoding may include applying a linear combiner to said processed block of information, said applying of a linear combiner being representable by a matrix multiplication operation based on a diagonal matrix containing frequency domain channel coefficients on its diagonal, said coefficients being obtained from a circulant channel matrix describing the communication channel from which said block has been received.

Signal processing apparatus may comprise receiving means for receiving a block transmission and a block transmission processor operable to perform processing in accordance with the above.

Another aspect of the invention provides a signal processor operable to process a block of information before transmission thereof in a block transmission based communication, the processor being operable to insert a cyclic prefix and a cyclic suffix into the block of information, and to apply a time reversal based prefilter prior to transmission to the data after cyclic prefix and cyclic suffix insertion, the prefilter being configured on the basis of knowledge of the condition of the channel over which communication is to be effected.

Another aspect of the invention provides a signal processor operable to process a signal received over a communications channel, the signal comprising a block transmission, the processor being operable to remove a length of said received block at one end thereof, representative of the combined length of a cyclic prefix and a cyclic suffix.

A method of establishing a wireless communication may comprise processing a block of information in preparation for transmission in accordance with the method above, emitting a signal bearing said processed block of information, receiving said signal across a wireless transmission channel, and processing said received signal in accordance with the method set out above.

All of the above aspects of the invention can be implemented by way of a computer program product, which may comprise computer executable instructions carried on a carrier medium. The carrier medium may comprise a storage product, or may comprise a signal, such as a download.

A system such as that described in the above statements may be used in multiple-access scenarios.

DETAILED DESCRIPTION OF PREFERRED EMBODIMENTS

Figure 11:
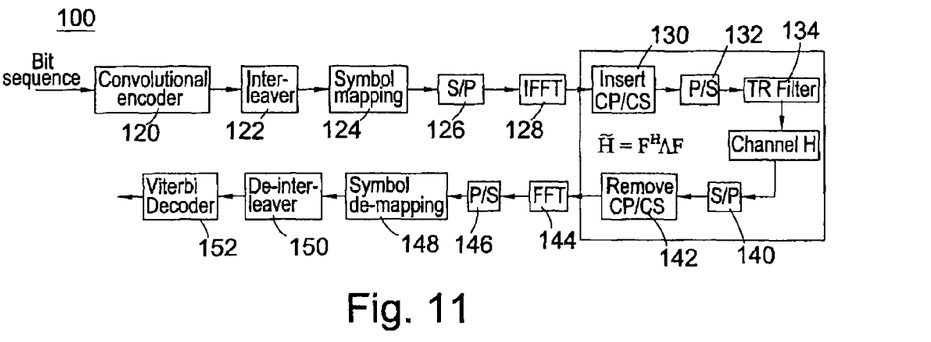
FIG. 11 illustrates a transmit and receive system in accordance with a specific embodiment of the invention, employing OFDM with a TR prefilter for one transmit and receive antenna.

A block diagram of a block transmission with a TR prefilter is presented in FIG. 11. FIG. 11 illustrates a communication system 100 in schematic form. As for the previous examples of the prior art arrangement, a transmit train is illustrated receiving a bit sequence, which is input to a convolutional encoder 120 and then to an interleaver 122. Symbol mapping 124 is then applied to the data, which is then converted from serial to parallel 126. The parallel data is then converted from frequency to time domain by an IFFT 128. A cyclic prefix and cyclic suffix is then inserted 130 and then, prior to TR prefiltering and transmission on a single antenna, the data is converted back from parallel to serial 132.

The transmitter is different from conventional block transmissions (e.g., OFDM, SC-FDE) through the existence of a TR filter 134 and through the manner of CP/CS insertion and removal.

Compared to the conventional block transmission schemes in FIGS. 1 and 2, the presently described embodiment comprises a TR prefilter 134. Signal sequences are convolved with this TR prefilter before transmitting from the antenna.

The equivalent composite channel g, which is the convolution of the TR prefilter h*(−t) and the actual channel h(t) itself, is complex symmetric. To understand this, the reader should consider the channel in the discrete time domain. $h=[h_0, h_1 \ldots h_{L-1}]^T$ denotes the length-L channel taps, $\bar{h}=[h^*_{L-1}, h^*_{L-2}, \ldots, h^*_0]^T$ denotes the time reversed, complex-conjugated version of h, and $g=[g_0, g_1, \ldots g_{2L-1}]^T$ denotes the overall equivalent channel. Thus:

$$g = h \otimes \bar{h}$$

or $$g = \left[ \sum_{k=0}^{L-1} |h_k|^2, \ldots, h_{L-1}h^*_1 + h_{L-2}h^*_0, h_{L-1}h^*_0 \right]^T$$

which is complex symmetric (i.e., $g_k = g^*_{2L-k}$). The centre element, $$g_L = \sum_{k=0}^{L-1} |h_k|^2,$$

real-valued, as it is the squared norm of all the channel taps.

Figure 13:
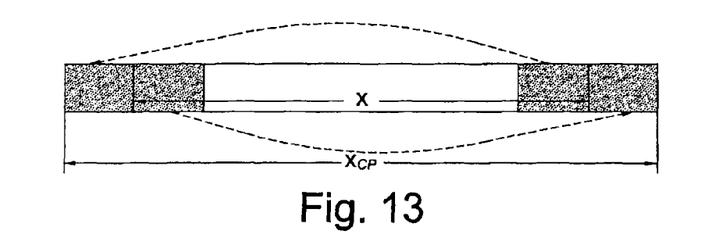
FIG. 13 illustrates schematically insertion of a CP and a CS in accordance with the specific embodiment.
Figure 14:
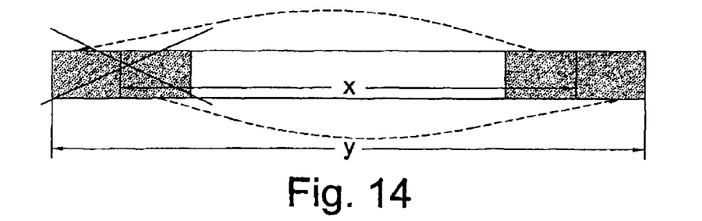
FIG. 14 illustrates schematically removal of a CP and a CS in accordance with the specific embodiment.

Turning now to the features of CP/CS insertion and removal, conventional block transmissions use CP/CS insertion and removal to form a circulant channel matrix such that the frequency selective channel can be converted into a frequency flat channel. In the present embodiment of the invention, in addition to forming a circulant matrix, the CP/CS are inserted and removed in a way such that the resulting frequency coefficients of the equivalent channel are real-valued. The process of CP insertion and removal is illustrated in FIGS. 13 and 14.

In the block transmission with TR prefiltering, both a cyclic prefix and a cyclic suffix are inserted at the beginning and the end of the transmitted block, respectively. Specifically, the last L symbols in a block are "copied" to the beginning of the block, and then the first L symbols are "copied" to the end of the block. Comparing FIGS. 3 and 4 with FIGS. 13 and 14 it is evident that the manner of CP/CS insertion in this embodiment is different from that taken in conventional block transmissions. The method of CP/CS insertion builds on the disclosure made in J. Chun, B. Ihm, and Y, Jin, "Method for detecting OFDM symbol timing in OFDM system", LG Electronics Inc., International Patent WO 2006/019255, February 2006. However, that document uses this transmit block structure for OFDM only, and only for the purpose of precise symbol timing detection. There is no specific description of how CP/CS is removed at the receiver, and no intention of forming real-valued frequency domain channel coefficients using this block structure. In the present embodiment, however, this block structure is used together with the CP removal at the receiver to facilitate the formation of the real-valued channel coefficients.

As illustrated, the reader will appreciate that the example shows a CP and CS of equal length. However, the reader will recognise that this need not be the case, and an embodiment wherein these are of different length will still have the benefit of ease of CP/CS removal as the example described herein.

A receiver train as illustrated receives transmitted signals on a single antenna, and these transmitted signals are converted from serial to parallel domain 140 and then the cyclic prefix is removed 142. Thereafter, a fast Fourier 144 converts the signal from time to frequency domain and the resultant frequency subcarriers are converted from parallel to serial 146. Symbol de-mapping takes place 148 and then the de-mapped symbols are deinterleaved 150 and a Viterbi decoder 152 extracts a bit sequence.

In the present embodiment, in the "Remove CP/CS" block 142 of the receiver, the symbols with a combined length of the cyclic prefix and cyclic suffix are removed from the beginning of the received block. This is different from the conventional block transmissions where the removal of symbols with a combined length of the cyclic prefix and cyclic suffix instead of the length of the cyclic prefix actually circulantly shifts the resulting equivalent channel down by a certain number of taps, where the said certain number being the length of the cyclic suffix.

Taking an example where the length of cyclic prefix and cyclic suffix are both L, by performing the aforementioned cyclic prefix and cyclic suffix insertion and removal, the equivalent circulant channel essentially becomes $$\tilde{g} = [g_L, g_{L+1}, \ldots g_{2L}, 0, \ldots 0, g_0, g_1, \ldots, g_{L-1}]^T$$

$$\text{or } \tilde{g} = [g_L, g^*_{L-1}, \ldots g^*_0, 0, \ldots 0, g_0, g_1, \ldots, g_{L-1}]^T,$$

using the complex-symmetric property of the equivalent channel impulse response g. The removal of the first 2L received symbols guarantees that the first tap of the resulting channel is real-valued. Due to the complex-symmetry of the rest of the channel taps, it can be shown that the frequency domain channel coefficients of $\tilde{g}$, obtained by performing a Fourier transform of $\tilde{g}$, are real-valued.

Again taking an example that the cyclic prefix and cyclic suffix are both of length L, the following description shows how the circulant channel matrix (with its first column being $\tilde{g}$) is formed and why its frequency domain channel coefficients are real-valued.

A block of transmitted signals is denoted as $x=[x_0, x_1, \ldots x_{N-1}]^T$. The signal after CP insertion is a length-(2L+N) vector $x_{CP}=[x_{N-L}, \ldots x_{N-1}, x_0, x_1, \ldots, x_{N-1}, x_0, \ldots, x_{L-1}]^T$. The noiseless received signal can therefore be written as $$y_{CP} = G x_{CP}$$

where G is an (2L+N)×(2L+N) lower Toeplitz matrix with its first column being the equivalent channel taps g with zeros padding to its tail. The CP and CS insertion can be expressed in a matrix form as $$x_{CP} = Tx.$$

Figure 15:
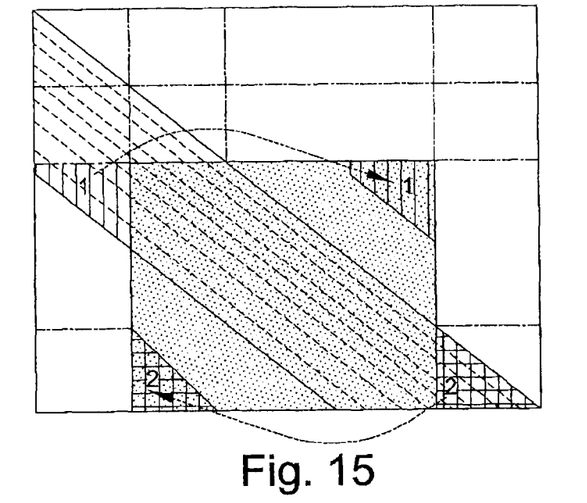
FIG. 15 illustrates formation of a circulant matrix in the specific embodiment of the invention.

Matrix T accounts for CP and CS insertion, which in this given example are both of length L. It is of size (2 L+N)×N and $$T = \begin{bmatrix} 0_{L \times (N-L)} & & I_L \\ & I_{N \times N} & \\ I_L & & 0_{L \times (N-L)} \end{bmatrix}$$

where $0_{L \times (2N+L)}$ denotes the L×(2N+L) zero matrix and $I_M$ denotes the M×M identity matrix. At the receiver, the first 2L taps are removed. The noiseless signal after CP removal can be written as $$y = R y_{CP}$$

where R is an N×(2L+N) matrix with its first 2L columns being zeros and the last N columns being an identity matrix, and it accounts for the removal of the symbols with a combined length of CP and CS from the beginning of the received block of signal, where in this given example the combined length of CP and CS is 2L. By re-expressing the equations above, the relationship becomes $$y = R y_{CP} = RGTx = \tilde{G}x$$

where $\tilde{G}$ is an N×N circulant matrix with its first column being $\tilde{g}$, which can be illustrated by observing the matrix of FIG. 15, where the left and right multiplication of R and T moves the submatrices 1 and 2 in the original channel Toeplitz matrix G to the corresponding places marked in FIG. 15, thus forming the circulant matrix $\tilde{G}$ that is the grey-shaded matrix in that figure.

Next it can be demonstrated that the frequency channel coefficients of the equivalent channel after CP insertion and removal are real-valued. Taking the Fourier transform of $\tilde{g}$ gives $$g_F = F\tilde{g}$$
$$= \frac{1}{\sqrt{N}} \sum_{l=0}^{N-1} \tilde{g}_l e^{-j\frac{2\pi}{N}lk}$$
$$= \frac{1}{\sqrt{N}} g_L + \frac{1}{\sqrt{N}} \sum_{l=1}^{L} \tilde{g}_l e^{-j\frac{2\pi}{N}lk} +$$
$$\frac{1}{\sqrt{N}} \sum_{l=N-L}^{N} \tilde{g}_l e^{-j\frac{2\pi}{N}lk}$$
$$= \frac{1}{\sqrt{N}} g_L + \frac{1}{\sqrt{N}} \sum_{l=1}^{L} g^*_{L-l} e^{-j\frac{2\pi}{N}lk} +$$
$$\frac{1}{\sqrt{N}} \sum_{l=N-L}^{N-1} g_{l-N+L} e^{-j\frac{2\pi}{N}lk}$$
$$= \frac{1}{\sqrt{N}} g_L + \frac{1}{\sqrt{N}} \sum_{l=0}^{L-1} g^*_l e^{-j\frac{2\pi}{N}(L-l)k} +$$
$$\frac{1}{\sqrt{N}} \sum_{l=0}^{L-1} g_l e^{-j\frac{2\pi}{N}(l+N-L)k}$$
$$= \frac{1}{\sqrt{N}} g_L + \frac{2}{\sqrt{N}} \text{Re}\left(\sum_{l=0}^{L-1} g^*_l e^{-j\frac{2\pi}{N}(L-l)k}\right)$$

where the complex-symmetric property of the $\tilde{g}$ is used and $g_F$ is real-valued because $g_L$ is real-valued.

Once the complex-symmetric equivalent channel is formed, the remainder of the receiver structure is the same as that of the conventional block transmissions with single or multiple transmit and receive antennas. For clarity, reference numbers in FIG. 11 follow the same pattern as those used in FIGS. 1 and 2, with a prefix of "1".

From the process described above, the CP/CS insertion and removal are different from that used in the prior art, therefore the resulting channel frequency coefficients in the prior art are complex-valued, while those in the present invention are real-valued. Moreover, a TR prefilter is not used in the prior art exploring the STBC structure to block transmissions where time reversed symbols are transmitted, such as in systems of TR-STBC.

Figure 12:
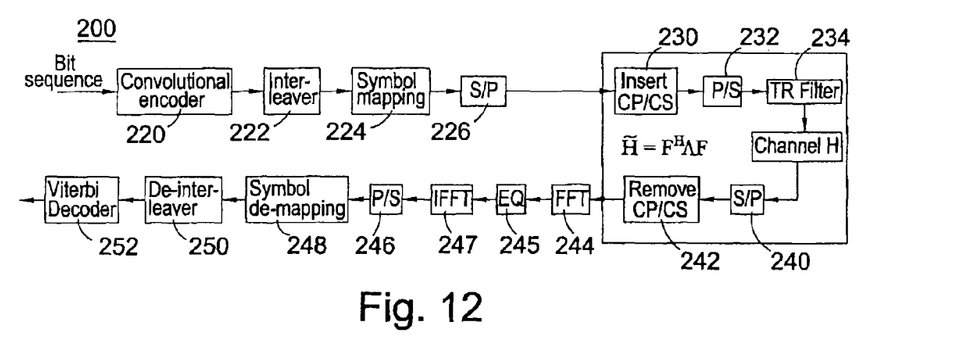
FIG. 12 illustrates a transmit and receive system in accordance with a specific embodiment of the invention, employing SC-FDE with a TR prefilter for one transmit and receive antenna.

For completeness, FIG. 12 shows an embodiment of the invention of configuration similar to FIG. 2. As per the relationship between FIGS. 1 and 11, elements of the arrangement shown in FIG. 12 which are similar to those employed in FIG. 1 are distinguished therefrom merely through the prefix '2'.

In contrast to the prior art where the DCT operation is used to obtain real-valued DCT channel coefficients for real constellations when the overall CIR is symmetric yet not complex symmetric, the above described embodiment uses an FFT/IFFT pair to diagonalise the channel matrix, and due to the difference in CP/CS insertion and removal, real-valued frequency domain channel coefficients can be obtained even when the transmitted signals are complex, and the overall CIR is conjugate-symmetric.

When systems with multiple transmit antennas are considered, and when block transmission with appropriate CP/CS insertion and removal allows a flat channel in the frequency domain, once the real-valued frequency domain channel coefficients are obtained, the system can be viewed equivalently as a system transmitting real signalling over the complex channels due to the commutative nature of transmitted symbols and the channel in a communication system model. Therefore, having the real-valued frequency domain channel coefficients, full rate (rate one) OSTBC existing for real constellations and an arbitrary number of transmit antennas can be directly applied to systems with the same number of transmit antennas but with complex constellations. This full rate OSTBC only exists for systems with two transmit antennas in conventional systems when complex signalling is transmitted.

For example, for systems with four transmit antennas and QPSK modulation, conventional block transmission cannot achieve full rate OSTBC as it exists only for two transmit antennas unless real constellations such as BPSK is used. By using the signal processing method detailed above, one can form the real-valued frequency domain channel coefficients regardless of whether the real or complex signalling is transmitted. This facilitates the use of existing full rate OSTBC designed for real signalling to systems with the same number of transmit antennas, regardless of real or complex constellation is used. In other words, the technique disclosed herein allows systems with complex signalling to achieve full rate OSTBC for arbitrary number of transmit antennas, while conventionally full rate OSTBC can only be achieved for two transmit antennas with complex signalling.

It has been shown that full rate OSTBC that achieves full diversity exists only for systems with two transmit antennas when the transmitted symbols are mapped onto a complex constellation, while full rate OSTBC exists for systems with any number of transmit antennas (two or more) when the transmitted symbols are mapped onto a real constellation.

Aspects of the present invention provide a method of utilizing a TR filter at the transmitter for block transmissions such as OFDM and SC-FDE, where CP/CS is inserted and removed in such a way that the resulting frequency domain coefficients of the equivalent channel are real-valued, thus allowing the application of full rate orthogonal STBC existing only for real constellations to systems with real or complex constellations. In other words, aspects of the present invention provide a method of achieving full rate OSTBC for systems with complex constellations and for any number (two or more) of transmit antennas, whilst the conventional block transmission with OSTBC can only achieve full rate OSTBC for systems with two transmit antennas for complex signalling.

A simple example of an application is for systems with four transmit antennas, where full rate OSTBC does not exist for complex constellations, while it does exist for real constellations.

Using the method provided herein, the existing full rate 4×4 OSTBC designed for real constellations can be applied to systems with four transmit antennas, regardless of whether real or complex constellations are used.

An example of the existing full rate 4×4 OSTBC designed for real constellations is shown below, where $x_i$ denotes the ith block of signals of length N to be transmitted, and the jth block of symbol transmitted on the mth antenna is given by the (jN)th to the ((j+1)N−1)th rows and the mth column of the matrix C ($1 \leq j$, $m \leq 4$)

$$C = \begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{bmatrix}$$

By using the abovementioned STBC, applying the TR prefilter and the CP/CS insertion and removal, real-valued frequency domain channel coefficients between each transmit antenna and the receiver can be formed. Consequently, the above STBC, although not orthogonal for complex signalling, can now be applied to complex signalling, and a simple linear combiner can be used to decouple the signals at the receiver. An example of the linear combiner in accordance with the abovementioned STBC is given below, where the diagonal matrix $\Lambda_i$ contains the real-valued frequency coefficients obtained by TR prefiltering and CP/CS insertion and removal for the ith antenna, and the kth diagonal element of $\Lambda_i$, is the kth entry of the Fourier transform of the equivalent channel from the ith transmit antenna to the receiver.

$$\Lambda = \begin{bmatrix} \Lambda_1 & \Lambda_2 & \Lambda_3 & \Lambda_4 \\ \Lambda_2 & -\Lambda_1 & \Lambda_4 & -\Lambda_3 \\ \Lambda_3 & -\Lambda_4 & -\Lambda_1 & \Lambda_2 \\ \Lambda_4 & \Lambda_3 & -\Lambda_2 & -\Lambda_1 \end{bmatrix}$$

The reader will note that the full rate OSTBC for systems with more than two transmit antennas when complex signalling is transmitted is at the expense of doubled CP/CS length, and under the circumstances that channel information is available at the transmitter.

When channel state information is available at the transmitter, full diversity can be achieved by using the single mode eigen-beamforming method (mentioned earlier). However, this requires the computation of the singular value decomposition (SVD) of the channel matrix. In block transmissions such as OFDM, the complexity of eigen-beamforming becomes even higher because SVD needs to be performed for each subcarrier or a group of subcarriers. This embodiment of the invention provides comparable performance to that using the eigen-beamforming method in a block transmission system with channel coding, while it does not require the SVD operation, and therefore offers a much reduced computational complexity compared to the single mode eigen-beamforming method, which will be detailed below.

Figure 16:
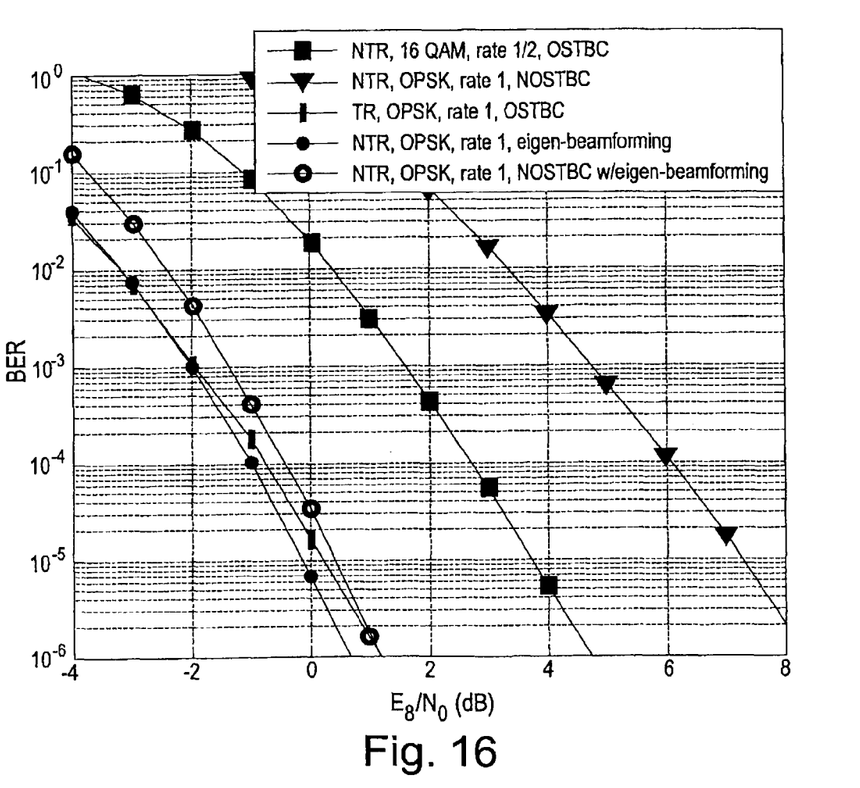
FIG. 16 illustrates a number of performance examples for demonstration of specific embodiments of the invention and FIG. 17 illustrates a comparison of complexity between the method of the specific embodiment of the invention and that of a single mode eigen-beamforming method.

Using an example system with four transmit antennas and one receiver antenna and OFDM transmission with channel coding, simulation results with a bandwidth efficiency of 2 bits/s/Hz under i.i.d. channels show that when a full-rate STBC is used (the STBC is orthogonal for real constellations yet not orthogonal for complex constellations), at a BER level of $10^{-4}$, using QPSK, the present embodiment (TR, QPSK, rate 1, OSTBC in FIG. 16) provides approximately a 7 dB gain compared to a system that uses the same STBC but does not use TR (NTR, QPSK, rate 1 NOSTBC), and about a 4 dB gain compared to the performance of using low rate (rate ½) OSTBC without TR (NTR, 16QAM, rate ½, OSTBC), as now 16QAM instead of QPSK has to be used to compensate for the rate loss. Moreover, it provides comparable performance to systems using eigen-beamforming, with or without the application of STBC (NTR, QPSK, rate 1, NOSTBC w/eigen-beamforming and NTR, QPSK, rate 1, eigen-beamforming, respectively.

Figure 17:
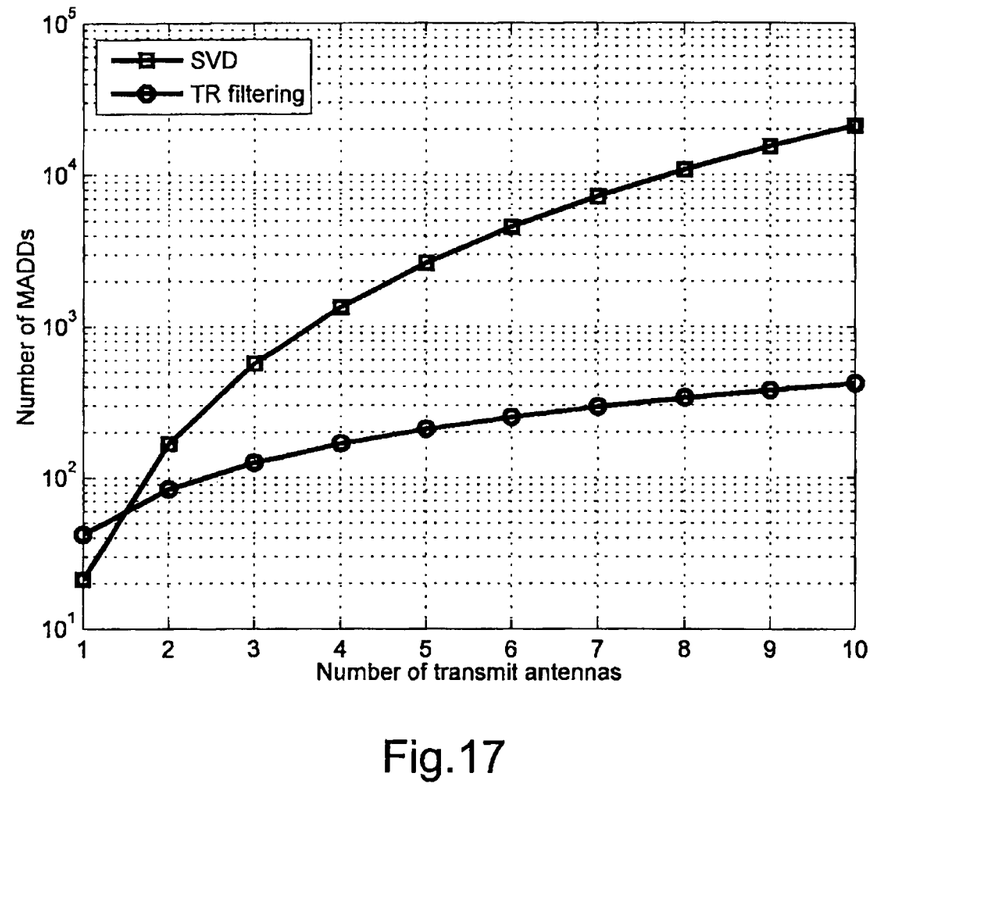

In terms of complexity, both the eigen-beamforming method and the method provided in the present disclosure require channel state information to be available at the transmitter (CSIT) while conventional STBC does not. However, when CSIT is available, the present arrangement does not require a singular value decomposition (SVD), and therefore has a much lower computational complexity than the eigen-beamforming schemes. FIG. 17 plots the number of multiplications and adds (MADDs) required for each complex signal in an OFDM transmission with 4 transmit antennas, 128 subcarriers, and 32 CP, showing that the computational complexity of SVD is 10 times higher than the present invention for systems with four transmit antennas and 100 times higher than the present invention for systems with eight transmit antennas.

Aspects and features of the invention have been described above without imposing a limitation on the scope of protection sought. The scope of protection should be derived from the accompanying claims, read in the light of, but in no way limited by, the above description.

The invention claimed is:

1. A method of operating a block transmission based communication apparatus, the method comprising processing a block of information before transmission thereof from the block transmission based communication apparatus by:
   inserting a cyclic prefix and a cyclic suffix into the block of information before applying a time reversal based prefilter prior to transmission to the data after cyclic prefix and cyclic suffix insertion, the prefilter being configured as a function of the channel impulse response of the channel over which communication is to be effected.

2. A method in accordance with claim 1, wherein the method is applied to a block of information intended for transmission from two or more antenna streams.

3. A method in accordance with claim 2, wherein the method comprises encoding a block of data for transmission by way of space time block coding, said space time block coding being orthogonal for real signaling yet not orthogonal for complex signaling.

4. A method in accordance with claim 1 wherein inserting of said cyclic prefix comprises copying a portion of information located at the end of the block opposite the end at which said prefix is to be inserted.

5. A method in accordance with claim 1 wherein said inserting of said cyclic suffix comprises copying a portion of information located at the end of the block opposite the end at which said suffix is to be inserted.

6. A method in accordance with claim 1 wherein the cyclic prefix and cyclic suffix are of equal length.

7. A method in accordance with claim 1 wherein said step of inserting a cyclic prefix and a cyclic suffix result in a processed block of information whose transmission defines a channel which can be represented by a circulant channel matrix, wherein a first column of the matrix is complex symmetric and a first entry of said column is real valued.

8. A method of processing a signal received over a communications channel, the signal comprising a block transmission, the method comprising:
   removing a length of said received block at one end thereof, representative of the combined length of a cyclic prefix and a cyclic suffix; and
   decoding said resultant block, taking account of circulation of information in said block as a result of removal of said cyclic suffix from the head of said block rather than from the end of said block,
   wherein decoding includes applying a linear combiner to said processed block of information said applying of a linear combiner being representable by a matrix multiplication operation based on a diagonal matrix containing frequency domain channel coefficients on its diagonal, said coefficients being obtained from a circulant channel matrix describing the communication channel from which said block has been received.

9. A signal processor operable to process a block of information before transmission thereof in a block transmission based communication, the processor being operable to insert a cyclic prefix and a cyclic suffix into the block of information before applying a time reversal based prefilter prior to transmission, to the data after cyclic prefix and cyclic suffix insertion, the prefilter being configured as a function of the channel impulse response of the channel over which communication is to be effected.

10. A signal processor operable to process a signal received over a communications channel, the signal comprising a block transmission, the processor configured to:
   remove a length of said received block at one end thereof, representative of the combined length of a cyclic prefix and a cyclic suffix; and
   decoding the resultant block taking account of circulation of information in said block as a result of removal of said cyclic suffix from the head of said block rather than from the end of said block,
   wherein decoding includes applying a linear combiner to said processed block of information, said applying of a linear combiner being representable by a matrix multiplication operation based on a diagonal matrix containing frequency domain channel coefficients on its diagonal, said coefficients being obtained from a circulant channel matrix describing the communication channel from which said block has been received.

11. A non-transitory computer readable storage medium comprising computer readable code operable, when executed on a general purpose processing means, to cause the performance of a method in accordance with any one of claim 1 or claim 8.

* * * * *